(12) United States Patent
Bergholz et al.

(10) Patent No.: US 6,765,494 B1
(45) Date of Patent: Jul. 20, 2004

(54) METHOD FOR SPACING CONTROL FOR A VEHICLE

(75) Inventors: Ralf Bergholz, Braunschweig (DE); Hubert Weisser, Lehre (DE); Klaus Timm, Wentorf (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 08/859,635

(22) Filed: May 20, 1997

(30) Foreign Application Priority Data

Jun. 20, 1996 (DE) .......................................... 196 24 617

(51) Int. Cl.[7] ................................................. G08G 1/16
(52) U.S. Cl. .................... 340/903; 340/573.1; 340/576; 701/301
(58) Field of Search ................................ 340/903, 436, 340/435, 439, 576, 573.1, 575; 364/701.044; 701/301

(56) References Cited

U.S. PATENT DOCUMENTS

| | | | |
|---|---|---|---|
| 5,189,619 A | * 2/1993 | Adachi et al. | 364/426.04 |
| 5,357,438 A | * 10/1994 | Davidian | 364/461 |
| 5,375,060 A | 12/1994 | Nöcker | 364/461 |
| 5,400,864 A | 3/1995 | Winner et al. | 180/169 |
| 5,670,953 A | 9/1997 | Satoh et al. | 340/903 |

FOREIGN PATENT DOCUMENTS

| | | |
|---|---|---|
| DE | 19509178 | 9/1995 |
| DE | 4437678 | 5/1996 |

OTHER PUBLICATIONS

"Abstandsregelung von Fahrzeugen mit Fuzzy Control" by Holve et al.
"Intelligent Cruise Control With Fuzzy Logic" Proceedings of the Intelligent Vehicles Symposium, Jun. 1, 1992.
"Longitudinal Control of An Autonomous Vehicle through a Hybrid Fuzzy/Classical Controller" Weseon Conference, US, IEEE Center Sep. 27, 1994.
European Patent Office Search Report in Application EP97 102859, dated Mar. 14, 2000.

* cited by examiner

*Primary Examiner*—Daryl Pope
(74) *Attorney, Agent, or Firm*—Baker Botts L.L.P.

(57) ABSTRACT

A method for spacing control for a vehicle in which an intended vehicle spacing from a vehicle in front is determined as a function of at least the current vehicle speed by an arrangement for calculating the intended spacing. In order to increase the acceptability of the spacing control method by a vehicle driver, the control arrangement has a transfer function which is adaptable to an individual driving characteristic of the vehicle driver.

27 Claims, 6 Drawing Sheets

METHOD FOR SPACING CONTROL FOR A VEHICLE

BACKGROUND OF THE INVENTION

This invention relates to methods for spacing control for a vehicle which includes an arrangement for calculating the intended spacing from a vehicle traveling in front.

A method for speed control and spacing control of a vehicle is described in the U.S. Pat. No. 5,400,864. According to that method, the current spacing and vehicle speed are registered and from these the intended values for the spacing from an object such as a motor vehicle located in front of the vehicle and the vehicle speed are determined and set automatically. In this method, a problem arises because the automatic speed control and spacing control are provided as driver-aiding systems and their acceptance by the vehicle driver depends on how closely the automatic control behavior resembles his or her own driving behavior, particularly with respect to maintaining a spacing from the motor vehicle traveling in front.

In order to solve this problem, the publication "Abstandsregelung von Fahrzeugen mit Fuzzy-Control" [Spacing control of vehicles using fuzzy control], Tagungsband Aktuell, Springer Verlag, 1993, discloses a spacing model in which the spacing depends on the driver type and the weather instead of a fixedly prescribed intended spacing. In this case, the driver type is intended to be determined by an external sensing mechanism, but no arrangement for reliable automatic identification of the driver type is described.

SUMMARY OF THE INVENTION

Accordingly, it is an object of the present invention to provide a method for spacing control for a vehicle which overcomes the disadvantages of the prior art.

Another object of the invention is to provide a method for vehicle spacing control by which the spacing can be adapted to the driving characteristics of the vehicle driver so that its acceptability to the vehicle driver is improved.

These and other objects of the invention are attained by providing a method and an arrangement for controlling the spacing of a vehicle from an object in front of the vehicle wherein the intended spacing from the object is determined utilizing a transfer function and including the step of adapting the transfer function for determining the intended spacing to an individual driving characteristic of a particular vehicle driver. In accordance with the invention, the adaptation is carried out so that the following time characteristic of the vehicle driver with respect to a vehicle traveling in front is maintained by the determination of the intended spacing. This is preferably carried out while the vehicle is being operated, that is to say during operation by the particular vehicle driver to whose driving characteristic the intended spacing determination is to be adapted.

The invention takes into account the fact that each vehicle driver, depending on his or her driving style, maintains a different spacing from the vehicle traveling in front, depending on the vehicle speed. A sporty driver will have a tendency to make full use of the limits permitted to him or her, that is to say, will keep the spacing from the vehicle traveling in front as small as possible. A defensive vehicle driver will tend to select a greater spacing.

According to a preferred embodiment of the invention, the arrangement for determining the intended vehicle spacing constitutes a fuzzy controller having at least two input variables, i.e., the current vehicle speed and at least one further input variable, for example the prevailing road friction or a variable for the current visibility conditions, and the intended spacing. The fuzzy controller has input membership functions with which truth values of linguistic values are determined for the input variables, has a control mechanism in which truth values for the intended spacing are determined from the truth values for the input values, and has an output membership function with which the intended spacing which is to be adjusted according to the input variables is determined from the truth values of the intended spacing.

In a preferred embodiment of the invention, value ranges for the driving speed and for the further input variables are determined in a first step and, in this arrangement, during the adaptation of an existing fuzzy controller, reference is made back to the value ranges covered by the input membership functions. In a second step, a number of classes is defined over the determined value ranges for the input variables. This definition can be carried out arbitrarily in the position or in the number of classes, but it can also follow the position and/or number of the existing input sets. Following this, in a learning phase, value combinations of the input variables and of the spacing maintained are processed by data set. In order to shorten the learning phase, the value combinations can be presented so that measured data which are not decisive for control are not used during the adaptation. In a further step, the classes defined in the second step are altered as a function of these registered value combinations. After completing the class adaptation, the adapted membership functions and the rules of the fuzzy controller are set up.

During the adaptation of the fuzzy controller, when defining the classes in the second method step, reference can be made back to the already available input membership functions and the vehicle speed and also to the further input variables.

During the definition of the classes over the value ranges of the input variables, points of intersection of a spacing to be maintained in the classes in the characteristic map are formed at the same time, and these constitute the rules of the fuzzy controller and also the sets of the output membership function.

Moreover, provision can be made to define, for specific ranges of the input variables, a value of the spacing which remains constant even during the adaptation of the new membership functions.

According to one embodiment of the invention, areas are defined around the classes within the value range of the input variables in which areas no new classes are formed, the value combinations of the input variables and the spacing which occur and which fall in one of these areas but in none of the classes are distributed to the adjacent classes in accordance with a weighting, and the areas surrounding these classes are altered in width in accordance with the hits of value combinations thus generated. This produces free areas in which, when a value combination arrives, a new class is formed. Following the generation of a new class, according to a preferred embodiment, an existing class is removed, with the result that the number of classes remains constant. When deciding which class is to be removed, the widest range of factors may play a part, for example the hit rate in one class as a result of value combinations already registered. At the time of removing a class, the value combinations of input variables and of the spacing value already assigned to said class i.e., the hits; are distributed to the adjacent classes in accordance with a weighting, preferably in the ratio of their distance over the value range of the input variables to the class to be removed. In addition, if appropriate, the adjacent classes are altered in accordance with the value combinations assigned to them.

For the generation of the new sets of the input membership functions on the basis of the newly formed classes, each class preferably forms at least one reference point of an input membership function. For the method according to the invention it is not necessarily required to cover the entire value range of the input variables by registered value combinations of the input variables and of the output variable. For such value ranges, and for value ranges having classes of extremely prominent spacing values at the point of intersection with classes of other input variables, a local and/or global interpolation can be carried out.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
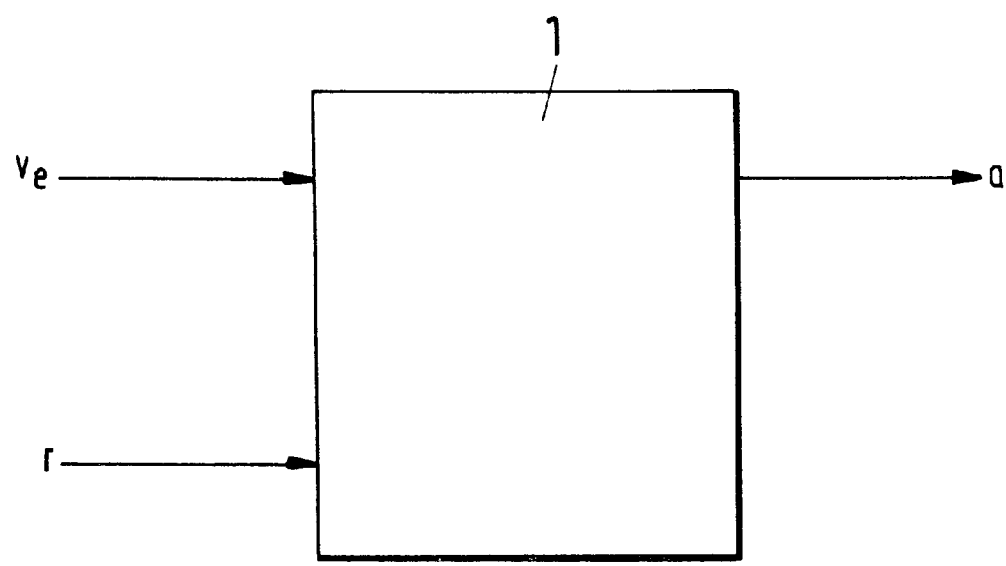
FIG. 1 is schematic block diagram illustrating a representative embodiment of a fuzzy controller according to the invention.

In the typical embodiment of the invention shown in FIG. 1, a fuzzy controller 1 is arranged to maintain an intended spacing $a_{soll}$ of a motor vehicle containing the controller from a motor vehicle traveling in front of it. In this case, the current speed of the vehicle $v_e$ and the prevailing road friction r are intended to represent the input variables to the fuzzy controller and the intended spacing $a_{soll}$ to be maintained represents the output variable. In addition to the physical variables, i.e., the vehicle speed $v_e$ and the road friction r, the intended spacing $a_{soll}$ also depends to a great extent on the driving characteristics of the particular vehicle driver. Therefore, for a spacing control arrangement to be acceptable, it is important that the fuzzy controller 1 can be adjusted to the driving characteristics of a particular driver of the motor vehicle.

Figure 2:
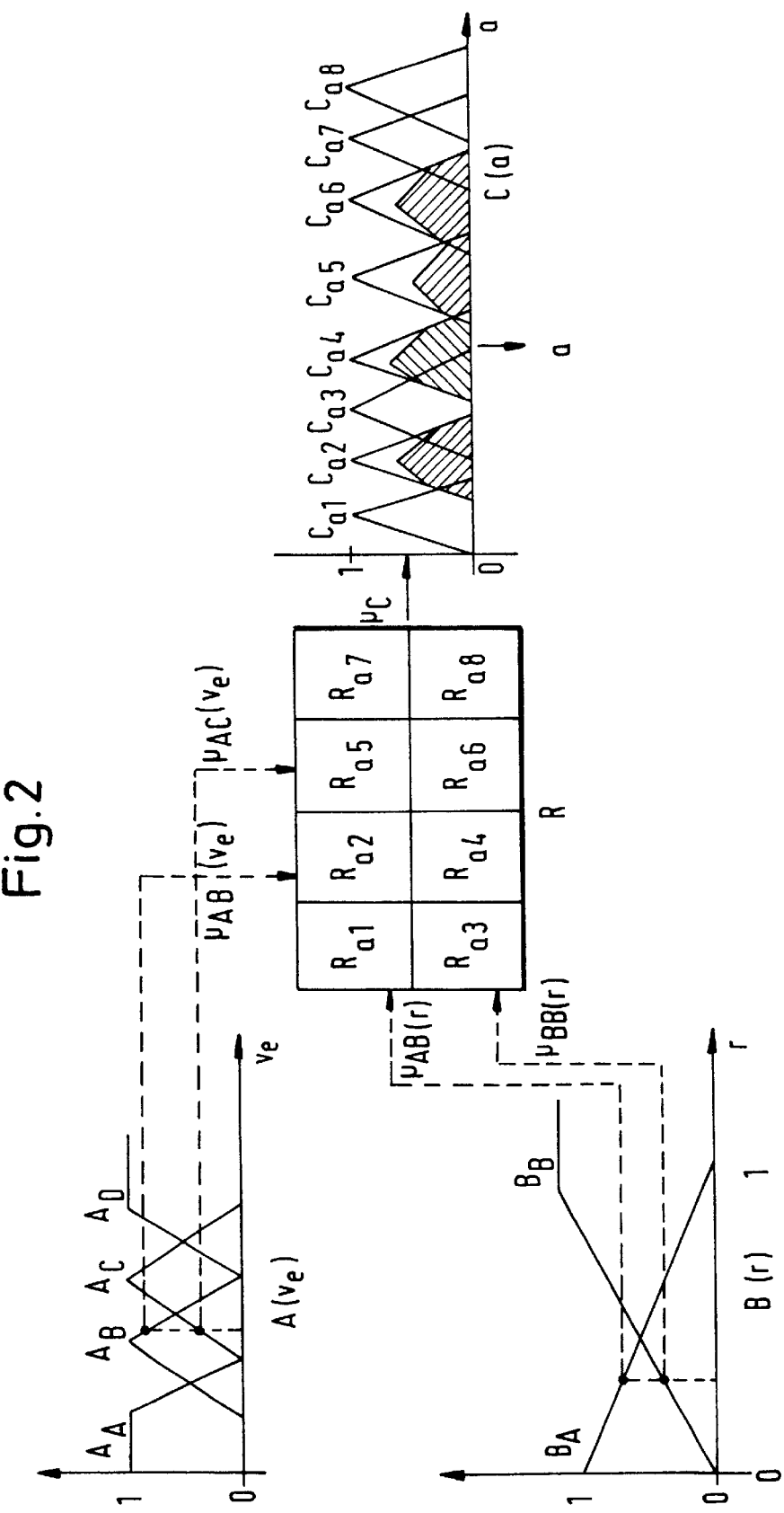
FIG. 2 is a schematic diagram illustrating the structure of the representative embodiment of the fuzzy controller of FIG. 1.

FIG. 2 shows the arrangement of the fuzzy controller 1, which includes input membership functions $A(v_e)$ and $B(r)$, a control mechanism R and output membership functions $C(a)$. By using the input membership functions $A(v_e)$ and $B(r)$, the measured input variables, i.e, the driving speed $v_e$ and the road friction r, are fuzzified, that is to say truth values $\mu_{AB}(v_e)$ and $\mu_{AC}(v_e)$ and $\mu_{AB}(r)$ and $\mu_{BB}(r)$ are formed. In the control mechanism R, the truth values $\mu_{AB}(v_e)$, $\mu_{AC}(v_e)$, $\mu_{AB}(r)$ and $\mu_{BB}(r)$ are logically combined using the rules $R_{a1}$–$R_{a8}$ and truth values $\mu_c$ for the intended spacing $a_{soll}$ are thus formed. From those values, values of the output variable $a_{soll}$ are formed.

According to the illustrated embodiment, in contrast with a normal output membership function, the output membership function $C(a)$ has a number of fuzzy sets $C_{a1}$–$C_{a8}$, which may correspond to the number of the rules $R_{a1}$–$R_{a8}$, the width of all the fuzzy sets being constant and their reference points, i.e., peaks, being formed by the spacing of a rule. The value of the intended spacing $a_{soll}$ is determined in accordance with the usual determination of the center of gravity.

Figure 3:
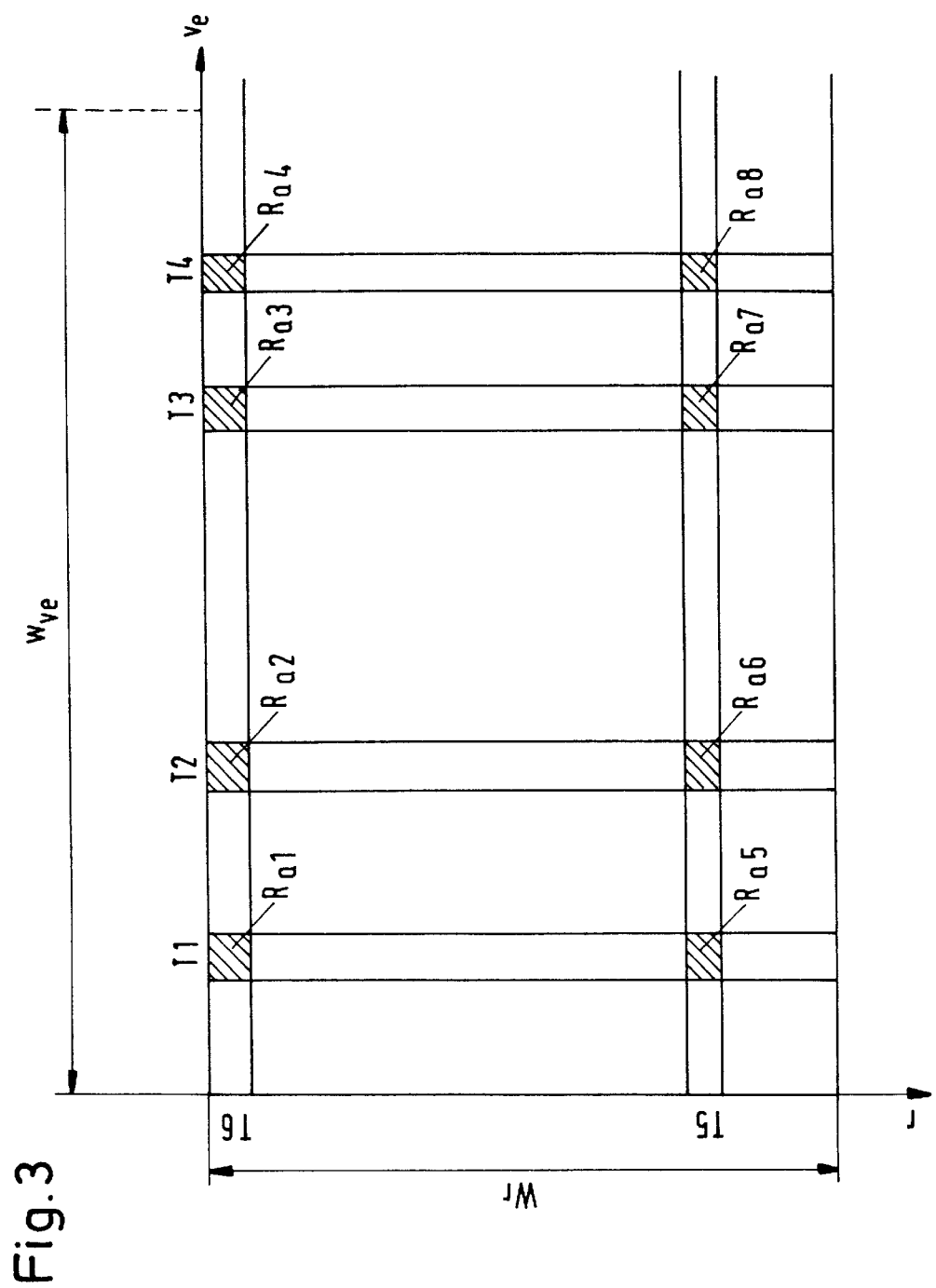
FIGS. 3–6 are schematic graphical representations illustrating a representative embodiment of a method according to the invention for the arrangement of a fuzzy controller.

FIGS. 3–6 show an example of the arrangement of the fuzzy controller 1 with reference to the vehicle speed $v_e$ and the prevailing road friction r. As shown in FIG. 3, following the definition of the input variables $v_e$ and r for the fuzzy controller, the value ranges for those variables, $w_{v_e}$ and $w_r$, are determined. For the vehicle speed $v_e$ the value range is determined by the possible driving speed range of the motor vehicle. For the road friction r the value range extends between 0 and 1. Subsequently, four classes T1–T4 are defined arbitrarily over the vehicle speed value range $w_{v_e}$ and two classes T5 and T6 are arbitrarily defined over the road friction value range $w_r$. The number of these classes is the same as the envisages number of input membership functions $A(v_e)$ and $B(r)$ as shown in FIG. 2.

In selection of classes, expert knowledge can be involved in that the classes T1–T6 are placed at points having a decisive influence on the future system behavior. In the illustrated embodiment, points of intersection $R_{a1}$–$R_{a8}$, of a specific spacing value a of the classes T1–T4 for the driving speed $v_e$, together with the classes T5 and T6 for the friction r, form first rules for the fuzzy controller as well as the reference points for the sets of the output membership function but, because of the arbitrary arrangement of the classes, they are not realistic. Moreover, an inalterable minimum value for the intended spacing $a_{soll}$ from the motor vehicle traveling in front is determined for the initial value ranges $w_{v_e}$ and $w_r$. This is a value below which the distance may not fall during the travel of a motor vehicle.

Figure 4A:
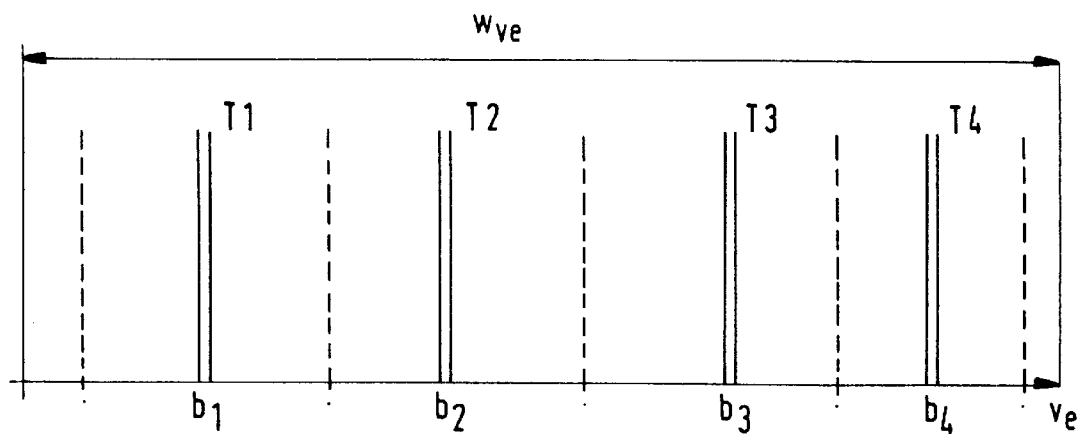
Figure 4B:
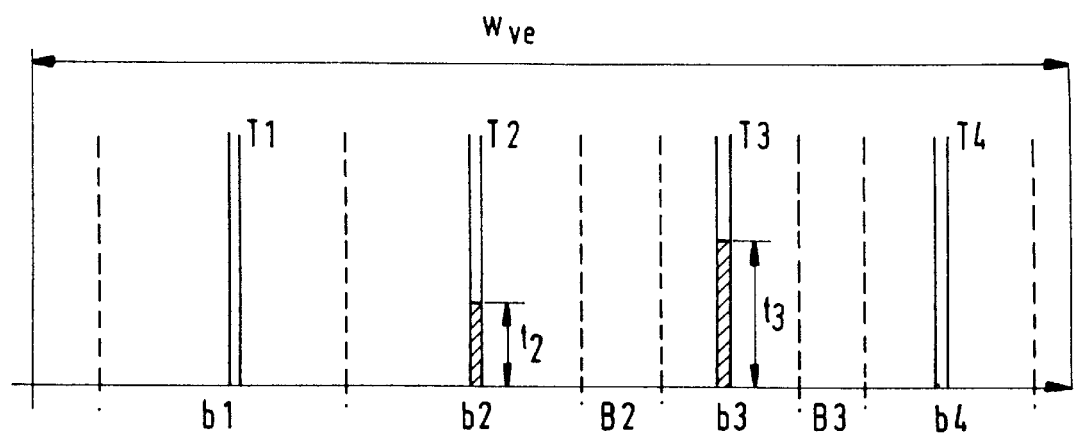

During the learning phase of the fuzzy controller, that is to say while the motor vehicle is being controlled by a vehicle driver, value combinations of the driving speed $v_e$, of the prevailing road friction r and of the maintained spacing value a are detected by data set and it is determined whether these value combinations fall into one of the classes T1–T4, T5 and T6. At the same time, before the use of an incoming value combination $v_e$, r and a, a selection may be carried out with the result that value combinations occurring in specific driving situations, for example an overtaking procedure, are not used for the adaptation. The classes are altered, removed and/or new classes are formed in accordance with the incoming value combinations. One possible way of forming classes is represented in FIG. 4 using the input variable $v_e$.

As also shown in FIG. 3, the classes T1–T4 are defined arbitrarily over the value range $w_{v_e}$ of the vehicle speed in a first step. Formed around these classes are areas $b_1$–$b_4$ in which, if value combinations $v_e$, r and a arrive in the learning phase, no new class may be formed. The arriving value combinations are, however, distributed to the adjacent classes, for example T2 and T3, in accordance with a weighting. Depending on the hit rates $t_2$ and $t_3$ thus generated, the areas $b_2$ and $b_3$ surrounding the classes T2 and T3 are altered such that free areas B2 and B3 are produced in which new classes are formed if a value combination arrives. When forming a new class, an existing class is advantageously removed. When deciding which class is to be removed, the number of hits resulting from the value combinations, for example, plays a part. At the time of a class removal, the information i.e., the hits, already assigned to that class is distributed to the adjacent classes in the ratio of their distance in the value ranges $w_{v_e}$ and $w_r$ from the removed class, and the adjacent classes are altered in accordance with the information assigned to them.

Figure 5:
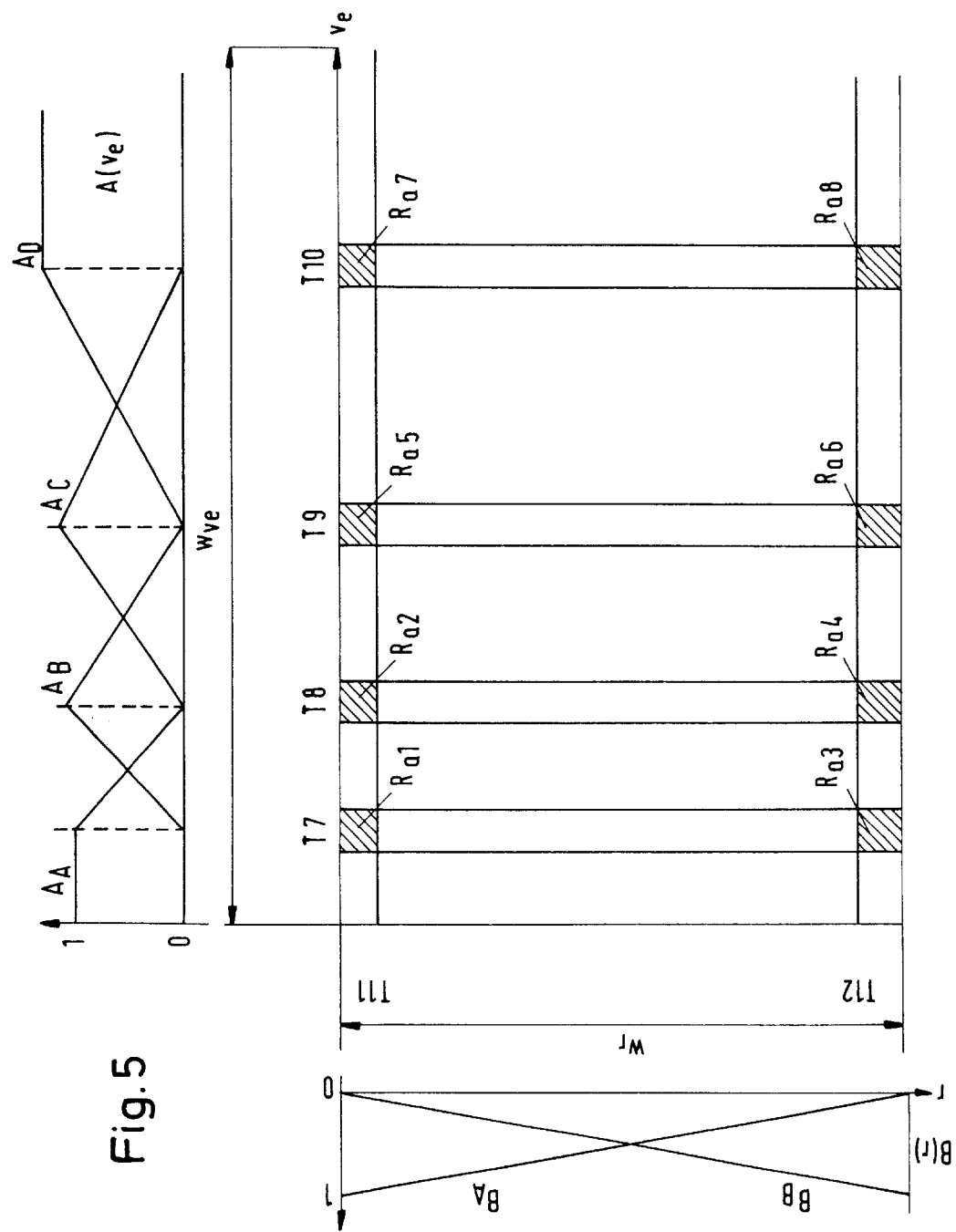
Figure 6:
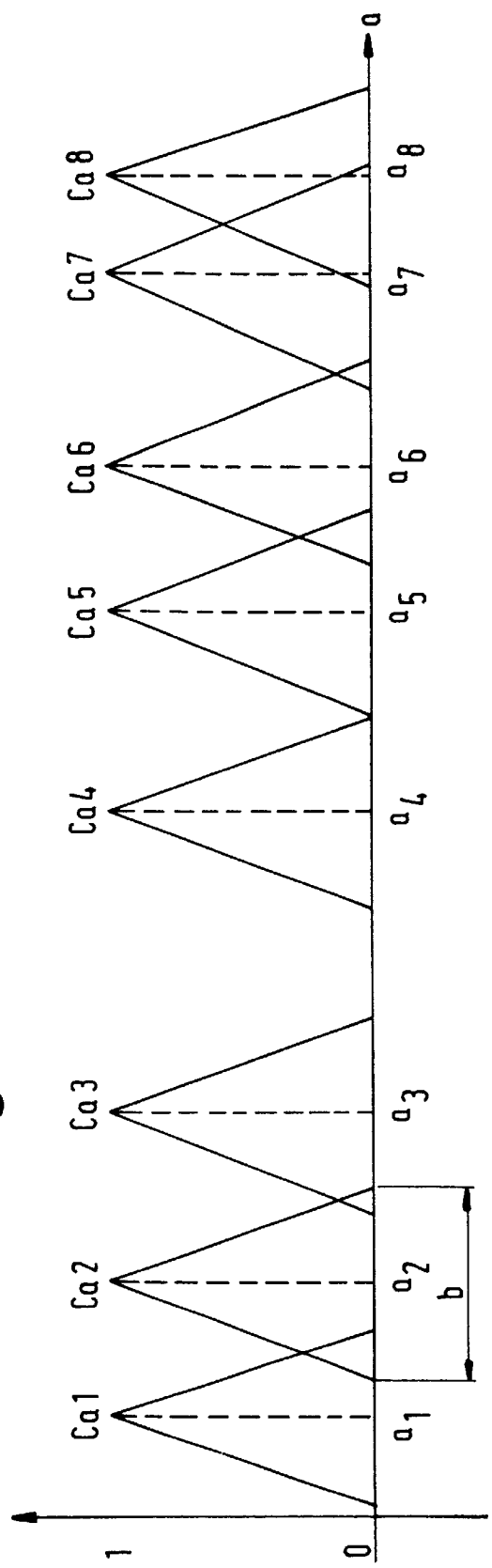

FIG. 5 shows an example of four new classes T7–T10, formed on the basis of the value combinations $v_e$, r and a registered during the learning phase, over the value range of the driving speed $v_e$, and of two new classes T11 and T12 in the value range of the road friction r. The sets $A_A$–$A_D$ of the input membership function $A(v_e)$ for the vehicle speed $v_e$ are formed on the basis of the newly formed classes T7–T10, and the sets $B_a$ and $B_b$ of the input membership function B(r) for the road friction value r are formed on the basis of the classes T11 and T12, each class forming at least one reference point of a set.

The points of intersection $R_{a1}$–$R_{a8}$ for spacing values $a_1$–$a_8$ for the classes T7–T10, together with the classes T11 and T12, simultaneously yield, in addition to the rules for the fuzzy controller, the reference points for the sets $C_{a1}$–$C_{a8}$ of the output membership function C(a) over the values a1–a8 for the spacing value a assigned to them and the sets in principle having the same width b as well.

Although the invention has been described herein with reference to specific embodiments, many modifications and variations therein will readily occur to those skilled in the art. Accordingly, all such variations and modifications are included within the intended scope of the invention.

We claim:

1. A method for spacing control for a vehicle having an arrangement for determining an intended spacing from a vehicle traveling in front based at least in part on the vehicle speed and a normal driving style of a particular driver and utilizing a transfer function, the method comprising the step of:
   adapting the transfer function to the normal driving style of the particular driver to produce an intended spacing adapted to the normal driving style of the driver
   wherein the normal driving style is determined by at least one driving technique of the driver.

2. A method according to claim 1 including the step of:
   adapting the transfer function of the spacing-determining arrangement in such a way that the normal following time of a particular driver with respect to a vehicle traveling in front is maintained based on the determination of the intended spacing.

3. A method according to claim 1, wherein the adaptation to the normal driving style of the particular driver is carried out while the vehicle is being operated by the particular driver.

4. A method according to claim 1 wherein the prevailing road friction and/or a variable for the prevailing visibility conditions is used as the further input variable.

5. A method according to claim 1, wherein at least two drivers are capable of operating the vehicle, and wherein the intended spacing is adapted depending which of the drivers is operating the vehicle.

6. A method according to claim 1, further comprising the step of determining the normal driving style of the particular driver based on a previous operation of the vehicle by the particular driver.

7. A method according to claim 6, wherein the previous operation is performed while the vehicle is being driven.

8. A method for spacing control for a vehicle having an arrangement for determining an intended spacing from a vehicle traveling in front based at least in part on the vehicle speed and utilizing a transfer function comprising the step of:
   adapting the transfer function to a driving characteristic of a particular driver to produce an intended spacing adapted to the driving characteristic wherein the arrangement for determining an intended spacing comprises a fuzzy controller having the vehicle speed as an input variable and having at least one further input variable and having the intended spacing as an output variable, wherein the fuzzy controller has input membership functions with which truth values of linguistic values are determined at least for the input variables, has a control mechanism in which truth values for the intended spacing are determined from the truth values for the input variables, and has an output membership function with which the intended spacing which is to be adjusted is determined from the truth values of the intended spacing.

9. A method according to claim 8 including the steps of:
   defining a number of classes over the value ranges of the input variables;
   registering, in a learning phase, value combinations of the input variables and of the spacing which occur;
   altering or removing classes and/or forming new classes as a function of the registered value combinations; and
   generating, as a function of the current classes, adapted membership functions and adapted rules of the control mechanism.

10. A method according to claim 9 wherein the number and the positions of the classes are defined as a function of the existing input membership functions.

11. A method according to claim 9 including the steps of:
   defining areas around the classes in the value range of the input variables, in which defined areas no new classes are formed;
   distributing value combinations of the input variables and of the spacing which occur in and which fall in one of the defined areas but in none of the classes in accordance with a weighting;
   altering the width of the areas surrounding such adjacent classes to produce free areas, and;
   forming a new class in a free area when a value combination arrives which does not fall in an existing class.

12. A method according to claim 9 including the step of:
   removing an existing class when a new class is formed;
   distributing the value combinations of the input variables and the spacing in the removed class to adjacent classes; and
   altering the adjacent classes in accordance with the value combinations of the input variables and the spacing assigned to them.

13. A method according to claim 9 wherein, following the adaptation of existing classes, each class forms at least one reference point of a set of the input membership function.

14. A method according to claim 9 wherein the rules of the fuzzy controller are formed by the points of the sets of the output membership functions.

15. A method according to claim 9 wherein the spacing value of each point of intersection of the classes forms a reference point of the sets of the output membership functions.

16. A method according to claim 9 including the step of:
   carrying out a local and/or global interpolation in areas of the value ranges of the input variables for which no value combinations of the input variables and the spacing were registered during the learning phase and/or which have classes with extremely prominent value combinations.

17. An arrangement for determining an intended vehicle spacing from a vehicle traveling in front based on a normal driving style of a particular driver, comprising:

a controller with an adaptable transfer function having the vehicle speed and at least one further variable as input-variables and having intended vehicle spacing as an output variable, and a spacing modifier for adapting the transfer function of the controller to the normal driving style of the particular driver to adjust the intended vehicle spacing in accordance with the normal driving style of the particular driver, wherein the normal driving style is determined by at least one driving technique of the driver.

18. A method for spacing control for a vehicle having an arrangement for determining an intended spacing from a vehicle traveling in front based at least in part on the vehicle speed and utilizing a transfer function, the method comprising the step of:

adapting the transfer function to a normal driving characteristic of a particular driver to produce an intended spacing adapted to the normal driving characteristic of the driver, wherein the adaptation to the normal driving characteristic of the particular driver is carried out while the vehicle is being driven by the particular driver.

19. A method according to claim 18, wherein the normal driving characteristic is a normal driving style of the particular driver.

20. A method according to claim 18, wherein at least two drivers are capable of operating the vehicle, and wherein the intended spacing is adapted depending which of the drivers is operating the vehicle.

21. An arrangement for determining an intended vehicle spacing from a vehicle traveling in front based on a normal driving style of a particular driver, comprising:

a controller with an adaptable transfer function having the vehicle speed and at least one further variable as input variables and having intended vehicle spacing as an output variable, and a spacing modifier for adapting the transfer function of the controller to the normal driving style of the particular driver to adjust the intended vehicle spacing in accordance with the normal driving style of the particular driver, wherein at least two drivers are capable of operating the vehicle, and wherein the intended spacing is adapted depending which of the drivers is operating the vehicle.

22. An arrangement for determining an intended vehicle spacing from a vehicle traveling in front based on a normal driving style of a particular driver, comprising:

a controller with an adaptable transfer function having the vehicle speed and at least one further variable as input variables and having intended vehicle spacing as an output variable, and a spacing modifier for adapting the transfer function of the controller to the normal driving style of the particular driver to adjust the intended vehicle spacing in accordance with the normal driving style of the particular driver, wherein the controller determines the normal driving style of the particular driver based on a previous operation of the vehicle by the particular driver.

23. An arrangement according to claim 22, wherein the previous operation is performed while the vehicle is being driven.

24. An arrangement for determining an intended vehicle spacing from a vehicle traveling in front, comprising:

a controller with an adaptable transfer function having the vehicle speed and at least one further variable as input variables and having intended vehicle spacing as an output variable, and a spacing modifier for adapting the transfer function of the controller to a normal driving characteristics of a particular driver to adjust the intended vehicle spacing in accordance with the normal driving characteristic of the particular driver, wherein the adaptation to the normal driving characteristic of the particular driver is carried out while the vehicle is being driven by the particular driver.

25. An arrangement according to claim 24, wherein the normal driving characteristic is a normal driving style of the particular driver.

26. An arrangement according to claim 24, wherein at least two drivers are capable of operating the vehicle, and wherein the intended spacing is adapted depending which of the drivers is operating the vehicle.

27. A method for spacing control for a vehicle having an arrangement for determining an intended spacing from a vehicle traveling in front based at least in part on the vehicle speed and a normal driving style of a particular driver and utilizing a transfer function, the method comprising the steps of:

adapting the transfer function to the normal driving style of the particular driver to produce an intended spacing adapted to the normal driving style of the driver; and determining the normal driving style of the particular driver based on a previous operation of the vehicle by the particular driver.

* * * * *